Patented Mar. 4, 1947

2,416,901

UNITED STATES PATENT OFFICE 2,416,901

METHOD OF HYDROGENATING PINENE RESIN

William H. Carmody, deceased, late of Springfield, Ohio, by Marie O. Carmody, administratrix, Springfield, Ohio, assignor to Carmody Research Laboratories, Inc., Springfield, Ohio, a corporation of Ohio No Drawing. Application December 3, 1943, Serial No. 512,783

6 Claims. (Cl. 260—80)

This invention relates to the hydrogenation of pinene resin. The application herein is a continuation-in-part of the application of William H. Carmody, Serial No. 280,128, filed June 20, 1939.

Pinene resins, by which is meant those terpene resins of varying melting point which are composed of terpene polymers having the formula $(C_{10}H_{16})_n$ and respond to the pinene structure, and which are represented chiefly by resins composed preponderantly of polymers of beta-pinene, alpha-pinene, and mixtures of them, previously have been hydrogenated under the catalytic effect of Raney nickel catalyst and similar metal catalysts, as in patent of Marie O. Carmody, No. 2,249,112, dated July 15, 1941.

Pinene resins are of good light color and do not tend to yellowing in an order which detracts substantially from their utility. They also have good solubility in aliphatic hydrocarbon solvents, such as petroleum benzine and the like. One deteriorating effect to which pinene resins are subject on aging is oxidation, which leads to the development of embrittlement or incompatibility in compositions in which the pinene resin is included. The most active metal hydrogenation catalyst for resins, which is Raney nickel, is relatively expensive to use because of its initial high cost, its susceptibility to catalyst poisons, and the difficulties attendant upon its storage.

The object of this invention is to provide a method of hydrogenating pinene resin in a manner effectively to inhibit oxidation in the resin on aging, under the hydrogenation-inducing effect of a catalyst practice with which is less expensive than with Raney nickel, and hydrogenation with which is adequately effective in preparing pinene resin for certain associations and uses.

In accordance with this invention hydrogenation of pinene resins is conducted under the catalytic effect of certain selected oxide catalysts which are metal chromites. Those catalysts, hydrogenation in the presence of which is herein disclosed, are copper chromite, iron chromite, and nickel chromite, copper chromite being the preferred member of this group of effective hydrogenation catalysts. Considering this group of hydrogenation catalysts, it was unexpected that their hydrogenation-inducing effect would be effective under the moderate temperature conditions requisite for the hydrogenation of pinene resin. The general practice in the use of catalysts of that sort is to hydrogenate at relatively high temperature, and the pinene polymers show a marked tendency to decompose at temperatures above 250° C. and below those at which hydrogenation under the influence of chromite catalysts previously has been conducted, as in the synthesis of methanol and like processes involving a hydrogenation step. It is, however, the discovery herein disclosed that hydrogenation may be conducted under moderate conditions with the use of catalysts of this group, with the result of moderately hydrogenating the resins to an extent satisfactory in precluding subsequent oxidation in the resin.

As explained in companion application Serial No. 512,785, filed Dec. 3, 1943, the group of catalysts comprising copper chromite, iron chromite, and nickel chromite is not susceptible of generic classification by class or group in the periodic system of the metals comprised by them. Whereas three of the catalysts are metal chromites and all are metal oxides, their communal property consists in their utility as hydrogenation catalysts and in the fact that they are oxides (and specifically chromites) of metals rather than metals. Copper chromite (the preferred member of the group) is a well-known chemical substance, the preparation of which need not here be discussed.

The copper chromite is used in the form of a black powder which is crushed and sifted to render it uniform for catalysis. It is noteworthy that no special care of the catalyst is required, that is it does not have to be preserved under special conditions as is the case with Raney nickel catalyst. Copper chromite is not as energetic in its catalytic effect as metallic nickel, and in the hydrogenation of pinene resins tends to cause the introduction of hydrogen only into those points in the resin molecule which are most easily attacked. The same is true of nickel chromite and iron chromite, the hydrogenation-inducing effect of which is slightly less than that of copper chromite. Experiment has shown that with all the catalysts of this group the quantity of catalyst used should be approximately 5% to 30% the weight of the resin subjected to hydrogenation, 5% of the catalyst being substantially the minimum with which the desired result will be secured. Although a percentage of the catalyst greater than 30% may be used, such greater percentage is under most circumstances unnecessary and performs no commensurately improved function in the hydrogenation reaction.

On the basis of a pinene resin melting about 95° C. to 125° C. (ball and ring), and considering specifically a pinene resin having an average molecular weight of about 800, an average of 1.5 mols. of hydrogen can be introduced without difficulty by means of these catalysts into each molecular equivalent of the pinene resin. With more difficulty, as much as 3 mols. or more of hydrogen can be introduced (other conditions being appropriate), by raising the temperature as high as is possible without decomposition of the resin and exercising care that the temperature does not exceed the permissible maximum while conducting the operation under relatively high pressure. With the lower melting pinene resins, the molecular proportion of hydrogen introduced tends to be lower under the same hydrogenating conditions, but in any case it is practical to introduce about .5 mol. of hydrogen into pinene resins of all molecular weights.

It has been found that mixtures of any two or more of the catalysts comprised in the group of copper chromite, nickel chromite, and iron chromite is at least as effective as an equal quantity of a single member of the group.

In exemplifying the invention by means of the several specific examples hereinafter set forth, a uniform procedure was followed, in order that the results might be comparative in their illustration. In the procedure of all the following examples, save those in which some step was unnecessary, a standard hydrogenation bomb was used; the resin was ground; and the ground resin, together with solvent and catalyst, was placed in the bomb and the bomb then closed. Hydrogen gas was admitted to the bomb from a suitable supply, as from cylinders of compressed hydrogen, at the pressure desired for each particular experiment. The whole assembly was then placed in rotating mechanism of suitable well-known kind and was warmed by gas burners. The bomb was fitted with a thermometer well carrying a thermometer in the usual manner.

During the progress of the hydrogenation, the rotating mechanism was stopped at intervals to observe data as to time, pressure, and temperature. When the reaction was completed, as indicated by cessation of pressure drop within the bomb, the temperature was restored to its initial value and the pressure was again observed. The catalyst was removed from the reaction solution by filtration and the solvent was removed by steam distillation. These procedures yielded a molten residual resin which was poured into a pan to harden. In operating to obtain recordable data, the usual precautions were taken to insure that the experiments were as quantitative as possible, and the bomb, therefore, was carefully calibrated to volume, and the volume of the reaction mixture deducted from it. The figure so secured represented the hydrogen gas volume in the bomb, which calculations gave the number of cubic centimeters of hydrogen gas employed.

To illustrate the invention, a hydrogenation treatment was conducted on a monomeric pinene fraction boiling from about 160° C. to 168° C.

*Example 1*

101.7 grams of the above noted pinene fraction was placed in the bomb without diluent and with 10 grams of copper chromite catalyst. The maximum temperature of the reaction was 101° C. The initial pressure was 1015 lbs. per square inch, and the final pressure was 700 lbs. per square inch. 18,950 cc. of hydrogen was absorbed.

In figuring the above absorption of hydrogen, the charge composed of the pinene and the copper chromite catalyst was placed in a bomb having a volume of 920 cc. The volume of charge was 100 cc., thus leaving a space having a volume of 820 cc. for the hydrogen gas. The run showed a pressure drop of 315 lbs. per square inch over the course of the reaction. 315 lbs. divided by 14.7 (1 atmosphere of pressure) equals 21.43. This multiplied by 820 with appropriate correction equals 18,950 cc. of hydrogen. Theoretically this showed 109% hydrogen absorption at the pinene double bond.

Apparently there is an alkene double bond in the monomeric units of both alpha-pinene and beta-pinene which remains after polymerization in the thermal unit of each of the pinene polymers. Considering as appears to be a fact that this alkene double bond represents the point at which oxidation and other reactions proceed most readily, substantial advantage is obtained by hydrogenating in an order which substantially saturates that most susceptible point of attack. In hydrogenating pinene resin, however, it is a matter of general desirability to introduce as much hydrogen as may be done in the presence of the catalyst specified, without utilizing conditions so drastic that they tend toward de-polymerization or disintegration of the pinene polymers. In hydrogenating the pinene polymers, it has been found that the quantity of chromite catalyst used, the pressure employed, and the maximum temperature at which hydrogenation is conducted, as well as the time of treatment, are important factors.

In conducting a series of experiments as illustrated in the following examples, it has been found that about 90° C. is the temperature at which hydrogen absorption begins to be substantial without using an unreasonably great quantity of catalyst, or unreasonably extending the time of treatment, or unreasonably increasing the pressure under which the hydrogenation is conducted. About 225° C. is the maximum temperature which may be used while insuring against de-polymerization of the resin. The desirable temperature range for the hydrogenation reaction may therefore be given as from about 90° C. to 225° C., and in approaching maximum hydrogenation with catalyst of this class advantage is obtained by conducting the hydrogenation treatment stepwise, hydrogenating first at a temperature up to about 150° C. to 220° C., and then increasing the temperature when hydrogen absorption lags up to about 225° C. as a maximum. Chromite catalysts desirably are used in quantities of from 5% the weight of the resin to 30% the weight of the resin. If the quantity of catalyst used is as low as about 5% the weight of the resin, compensatory high pressure and high temperature should be employed in the hydrogenation treatment. In no instance is it desirable to employ a pressure substantially exceeding 2100 lbs. per square inch.

In the following composite example, the pinene resin used in every run was a pinene resin polymerized from a cut of gum spirits of turpentine boiling within the approximate range of 160° C. to 168° C., which pinene resin had a melting point of 125° C., and an average molecular weight of 800. That resin was dissolved in petroleum benzine for hydrogenation, and copper chromite was used as the catalyst. The bomb used had a capacity of 920 cc., and it will be noted that the volume of the charge, with some slight variation due to different quantities of catalyst, was about 200 cc., leaving an approximate volume of 720 cc. available for hydrogen within the bomb. The example illustrates the control of hydrogenation with copper chromite catalyst by varying the quantity of catalyst used, the pressure under which the hydrogenation is conducted, the temperature of the hydrogenation, and the time of treatment, the combination of these factors being varied in the several runs.

toward oxidation sufficiently to improve the resin hydrogenated in the several different exemplifications for different uses and conditions of use anticipated for the resin. The higher melting pinene resins, such for example as those melting about 135° C. (ball and ring) and higher, are less susceptible to oxidation than the lower melting pin-

*Example 2*

| Run No. | Hydrogenator charge | Initial press. | Final press. | Time in minutes | Max. temp. | Cc. of H₂ absorbed | Per cent of H₂ entered at the double bond |
|---|---|---|---|---|---|---|---|
| (a) | 100 g. pinene resin<br>100 cc. PB<br>10 g. CuCrO | 1,020 | 910 | 305 | 156 | 4,380 | 105.0 |
| (b) | 100 g. pinene resin<br>100 cc. PB<br>10 g. CuCrO | 625 | 540 | 95 | 199 | 3,220 | 79.7 |
| (c) | 100 g. pinene resin<br>100 cc. PB<br>10 g. CuCrO | 610 | 575 | 190 | 184 | 1,180 | 45.6 |
| (d) | 100 g. pinene resin<br>100 cc. PB<br>10 g. CuCrO | 1,000 | 950 | 165 | 195 | 2,720 | 66.0 |
| (e) | 100 g. pinene resin<br>100 cc. PB<br>15 g. CuCrO | 1,065 | 980 | 215 | 199 | 4,160 | 101.0 |
| (f) | 100 g. pinene resin<br>100 cc. PB<br>5 g. CuCrO | 1,000 | 890 | 420 | 214 | 5,300 | 129.0 |
| (g) | 100 g. pinene resin<br>100 cc. PB<br>30 g. CuCrO | 990 | 800 | 170 | 156 | 10,200 | 250.0 |

The foregoing example illustrates that as the factors of temperature and pressure are increased, that is, as they become more drastic, the greater will the amount of hydrogen be which is absorbed by the resin. This, also, is true in measure as to the quantity of catalyst used and the time of treatment. At the higher temperatures and pressures and with larger amounts of catalysts, correspondingly increased amounts of hydrogen can be caused to combine with the pinene polymers of the resin.

It will be noted that in run (g) of Example 2 the hydrogen absorption is 10,200 cc. of hydrogen. That figure indicates an absorption of about 2.5 mols of hydrogen. In run (e) about 1 mol. of hydrogen is introduced, and in run (f) about 1.3 mol. was introduced. In all examples the hydrogen introduction is equal to at least about .5 mol.

It has been above noted that pinene resin unaltered by treatment does not become excessively discolored on aging, and that the pinene resin unaltered by treatment has good solubility in the low-priced petroleum solvents, such as petroleum benzine. An unaltered pinene resin does, however, exhibit some tendency toward oxidation, and insofar as such oxidation may become substantial it detracts from the aging properties of the resin and many compositions in which it is included. In the higher melting pinene resins, such as a pinene resin melting from about 90° C. (ball and ring) to 125° C. (ball and ring), the tendency toward oxidation is not great, and hydrogenation in an order as above effected reduces the tendency ene resins. Low melting pinene resins, such as the oily resin composed chiefly of pinene dimers, with some slight inclusion of pinene trimers, and other of the pinene polymers, are more susceptible to oxidation than are the higher melting exemplifications, and with them, hydrogenation is of increased importance in insuring that the progress of oxidation will not destroy their effectiveness as plasticizers in compositions in which they are included. It will be seen from Example 3, which follows, that the hydrogenation of pinene dimer oil, which is a pinene resin melting below 0° C., follows the same principles as are involved in hydrogenating the higher melting pinene resins in the presence of copper chromite. This example, like Example 2, is a composite example including several runs conducted under different conditions to illustrate the order of hydrogenation effected by controlling the several factors of pressure, temperature, quantity of catalyst, and time of treatment which have been above discussed.

*Example 3*

| Run No. | Hydrogenator charge | Initial press. | Final press. | Time in minutes | Max. temp. | Cc. of H₂ absorbed | Per cent of H₂ entered at the double bond |
|---|---|---|---|---|---|---|---|
| (a) | 100 g. dimer<br>10 g. CuCrO<br>No solvent | 1,015 | 940 | 330 | 175 | 4,820 | 58.5 |
| (b) | 100 g. dimer<br>0 g. CuCrO<br>No solvent | 980 | 865 | 165 | 217 | 6,420 | 78.0 |
| (c) | 100 g. dimer<br>10 g. CuCrO<br>No solvent | 1,060 | 790 | 180 | 153 | 15,080 | 183.0 |

It will be observed that in all the runs of Example 3, the introduction of hydrogen was in a molecular proportion of at least .5 mol. to each resin molecule.

The above is further evidence of the fact that the general effect of increased pressure, like that of increased temperature, is to induce increased quantities of hydrogen to be absorbed by the resin, and that other things being equal, this result is also roughly proportional to the use of increased quantities of catalyst. Thus in run (b), a large quantity of catalyst is used, the pressure is relatively high, and the temperature approaches the maximum permissible temperature for the hydrogenation.

The above consideration of the hydrogenation of pinene resin in the presence of copper chromite catalyst shows that there is close parallel between the hydrogenation of this resin and the hydrogenation of coumarone-indene resin as disclosed in companion application Serial No. 512,785, filed Dec. 3, 1943. Whereas the existence of a terminal alkene double bond in the pinene polymer has been assumed, the presence of such lone terminal double bond is not so thoroughly established as is the presence of an analogous bond in the polymers of coumarone and indene. It is, however, a fact that the two resins (the pinene resin and the coumarone-indene-resin) act so analogously under hydrogenation in the presence of chromite catalyst that the retention of such alkene double bond, or analogous point of attack, in the pinene polymers appears to be a reasonable and relatively safe assumption.

Analogously to the use of the chromite catalysts in the hydrogenation of coumarone-indene resin, iron chromite and nickel chromite are the substantial equivalents of copper chromite for inducing hydrogenation in pinene resin. A duplication of certain of the runs appearing above using iron chromite and nickel chromite in place of copper chromite as the catalyst shows closely analogous results. This is illustrated in the following examples.

Example 4

Taking a sample of the same pinene resin that was hydrogenated in the several runs of Example 2, namely a pinene resin having a melting point of 125° C. (ball and ring) and having a molecular weight of about 800, that resin was placed in the hydrogenation bomb with 100 cc. of petroleum benzine and 10 grams of iron chromite. The initial pressure was 1000 lbs. per square inch, and the final pressure was 955 lbs. per square inch. The time of treatment was 165 minutes, and the maximum temperature was 195° C. The hydrogen absorbed was 2,200 cc., or about 60% that theoretically required to saturate terminal double bonds of the pinene resin.

This example corresponds closely to run (d) of Example 2.

Example 5

100 grams of oily pinene resin composed in substantial entirety of pinene dimers was placed in the same bomb with 20 grams of iron chromite and without solvent. The initial pressure of the hydrogenation was 980 lbs. per square inch, and the final pressure was 875 lbs. per square inch. The time of treatment was 165 minutes, and the maximum temperature was 217° C. The hydrogen absorbed was 5,930 cc., or about 71% that theoretically required to saturate terminal double bonds of this low-melting pinene resin.

This example corresponds closely to run (b) of Example 3.

Example 6

Taking a sample of the same pinene resin that was hydrogenated in the several runs of Example 2, namely a pinene resin having a melting point of 125° C. (ball and ring) and having an average molecular weight of about 800, that resin was placed in the hydrogenation bomb with 100 cc. of petroleum benzine and 10 grams of nickel chromite. The initial pressure was 1000 lbs. per square inch, and the final pressure was 965 lbs. per square inch. The time of treatment was 165 minutes, and the maximum temperature was 195° C. The hydrogen absorbed was 2,040 cc., or about 56% that theoretically required to saturate terminal double bonds of this pinene resin.

This example corresponds closely to run (d) of Example 2.

Example 7

100 grams of oily pinene resin composed in substantial entirety of pinene dimers was placed in the same bomb with 20 grams of nickel chromite and without solvent. The initial pressure of the hydrogenation was 980 lbs. per square inch, and the final pressure was 880 lbs. per square inch. The time of treatment was 165 minutes, and the maximum temperature was 217° C. The hydrogen absorbed was 5,340 cc., or about 63% that theoretically required to saturate terminal double bonds of this low-melting pinene resin.

This example corresponds closely to run (b) of Example 3.

It is to be understood that mixtures of all or or any two of the three metal chromites forming the group of copper chromite, iron chromite, and nickel chromite may be used with satisfaction. In fact, it appears that such mixtures are more energetic under equal conditions of the hydrogenation treatment than is any selected lone member of the group.

The properties of pinene resin as to its resistance to discoloration, and its solubility in aliphatic solvents renders any substantial hydrogenation of the resin useful. That is, any substantial blocking of the tendency toward oxidation, such as that resulting from the introduction of about .5 mol. of hydrogen into the resin molecule, substantially increases the value of the resin. The use of the chromite catalysts which are of low cost, which present no difficulty in storage, and which function under moderate conditions of temperature and pressure is, therefore, advantageous. Even though the quantity of introduced hydrogen be small with respect to all theoretically available points of attack in the polymers, it is a fact that hydrogenation in the presence of chromite catalyst tends uniformly through the body of the pinene resin to introduce hydrogen at those points in the structure of the resin molecules, which are most susceptible to reaction with oxygen.

It is to be understood that in the foregoing where melting point is given without qualification, it is to be taken as determined by the ball and ring method of melting point determination. The term "pinene" resin is to be taken as inclusive of resins composed of the polymers of either alpha-pinene, beta-pinene, or a mixture of the polymers of those substances, together with such incidental proportions of other terpene components as are normally associated in manufacture of the resin. Where pressure is given in pounds without explanation, it is to be taken as meaning pounds per square inch. Where parts or proportions are given without express or implied qualifications as to comparison of volumes, it is to be taken that parts by weight is intended.

What is claimed is:

1. A method of hydrogenating polypinene resin which comprises the steps of bringing such resin into contact with hydrogen in the presence of copper chromite under such temperature and pressure conditions as chemically to introduce about .5 mol. to 3 mols. of hydrogen per molecular equivalent of polypinene resin structure, the hydrogenation being carried out at a temperature ranging from about 90° C. to 225° C. and at a pressure not substantially exceeding 2100 pounds per square inch.

2. A method of hydrogenating polypinene resin which comprises the steps of bringing such resin into contact with hydrogen in the presence of copper chromite under such temperature and pressure conditions as chemically to introduce about .5 mol. to 3 mols. of hydrogen per molecular equivalent of polypinene resin structure, the hydrogenation carried out at a temperature ranging from about 90° C. to 225° C., being effected stepwise by controlling the temperature in such manner that it does not exceed the range of 150° C. to 200° C. in the first stage thereof, with the balance of the hydrogenation being carried out at higher temperatures up to about 225° C., and the hydrogenation being effected under a pressure not substantially exceeding 2100 pounds per square inch.

3. A method of hydrogenating polypinene resin which comprises the steps of bringing such resin into contact with hydrogen in the presence of copper chromite under such temperature and pressure conditions as chemically to introduce about .5 mol. to 3 mols. of hydrogen per molecular equivalent of polypinene resin structure, the said polypinene resin being in dissolved form and the catalyst constituting about 5% to 30% by weight of the said resin, and the hydrogenation being carried out at a temperature ranging from about 90° C. to 225° C. and under a pressure not substantially exceeding 2100 pounds per square inch.

4. A method of hydrogenating polypinene resin which comprises the steps of bringing such resin into contact with hydrogen in the presence of a metal chromite catalyst selected from the group consisting of copper chromite, iron chromite, and nickel chromite, under such temperature and pressure conditions as chemically to introduce about .5 mol. to 3 mols. of hydrogen per molecular equivalent of polypinene resin structure, the hydrogenation being carried out at a temperature ranging from about 90° C. to 225° C., and under a pressure not substantially exceeding 2100 pounds per square inch.

5. A method of hydrogenating polypinene resin which comprises the steps of bringing such resin into contact with hydrogen in the presence of a metal chromite catalyst selected from the group consisting of copper chromite, iron chromite, and nickel chromite, under such temperature and pressure conditions as chemically to introduce about .5 mol. to 3 mols. of hydrogen per molecular equivalent of polypinene resin structure, the hydrogenation carried out at a temperature ranging from about 90° C. to 225° C., being effected stepwise by controlling the temperature in such manner that it does not exceed the range of 150° C. to 200° C. in the first stage thereof, with the balance of the hydrogenation being carried out at higher temperatures up to about 225° C., and the hydrogenation being effected under a pressure not substantially exceeding 2100 pounds per square inch.

6. A method of hydrogenating polypinene resin which comprises the steps of bringing such resin into contact with hydrogen in the presence of a metal chromite catalyst selected from the group consisting of copper chromite, iron chromite, and nickel chromite, under such temperature and pressure conditions as chemically to introduce about .5 mol. to 3 mols. of hydrogen per molecular equivalent of polypinene resin structure, the said polypinene resin being in dissolved form and the catalyst constituting about 5% to 30% by weight of the said resin, and the hydrogenation being carried out at a temperature from about 90° C. to 225° C. and under a pressure not substantially exceeding 2100 pounds per square inch.

MARIE O. CARMODY,
Administratrix of the Estate of William H. Carmody, Deceased.

REFERENCES CITED

The following references are of record in the file of this patent:

UNITED STATES PATENTS

| Number | Name | Date |
|---|---|---|
| 2,152,533 | Carmody, W. | Mar. 28, 1939 |
| 2,249,112 | Carmody, M. | July 15, 1941 |

OTHER REFERENCES

Waterman et al., Rec. Trav. Chim., vol. 55, pages 7–12 (1936).

Adkins et al., Journ. Amer. Chem. Soc., vol. 53, pages 1091 to 1095 (1931).

Certificate of Correction

Patent No. 2,416,901. March 4, 1947.

WILLIAM H. CARMODY, DECEASED, BY MARIE O. CARMODY, ADMINISTRATRIX

It is hereby certified that error appears in the printed specification of the above numbered patent requiring correction as follows: Column 6, Example 3, second column thereof, the indistinct portion under the heading "Hydrogenator charge" should appear as shown below—

{ 100 g. dimer____
 10 g. CuCrO____
 No solvent_____

{ 100 g. dimer____
 20 g. CuCrO____
 No solvent_____

{ 100 g. dimer____
 30 g. CuCrO____
 No solvent_____ and that the said Letters Patent should be read with this correction therein that the same may conform to the record of the case in the Patent Office.

Signed and sealed this 8th day of July, A. D. 1947.

[SEAL]

LESLIE FRAZER,
*First Assistant Commissioner of Patents.*